April 24, 1934.    A. SUCHTER    1,956,107

HOSE CLAMP

Filed May 17, 1933

INVENTOR
*ANTON SUCHTER*
BY
ATTORNEY

Patented Apr. 24, 1934

1,956,107

UNITED STATES PATENT OFFICE 1,956,107

HOSE CLAMP

Anton Suchter, Milwaukee, Wis.

Application May 17, 1933, Serial No. 671,454

7 Claims. (Cl. 24—19)

This invention relates to improvements in hose clamps.

Objects of this invention are to provide a hose clamp for binding a piece of hose of a pipe or nipple, and to provide an inexpensive clamp construction which may be very quickly and easily applied to any size hose desired.

Further objects are to provide a novel form of hose clamp which is so made that it can be tightened up like a belt by pulling on the loose end and may thereafter be drawn up to a very tight condition by screw means, the screw means itself acting to hold down the loose end of the clamp strap and prevent its retraction through the screw fitting.

Further objects are to provide a hose clamp which is so constructed that the strap may itself form the bridge piece or protecting member below the screw means, the screw means engaging this bridge member and preventing its buckling upwardly while the screw is being tightened.

Further objects are to provide an adjustable hose clamp which is so made that only one size may be carried in stock, the initial adjustment being secured for any size of hose and the final adjustment being secured by tightening the screw.

Embodiments of the invention are shown in the accompanying drawing, in which:—

Figures 1, 2:
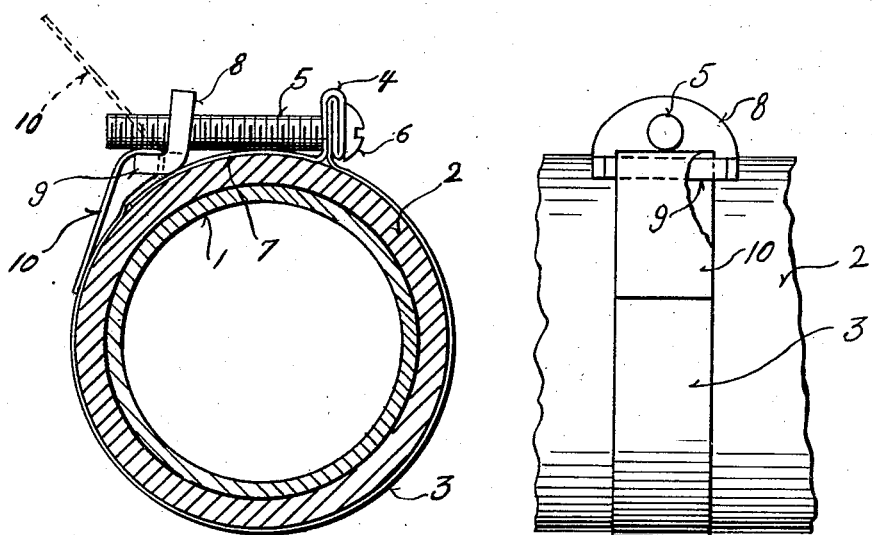
Figure 1 is a sectional view through a hose and pipe with the clamp in place.
Figure 2 is a side view of the structure shown in Figure 1, such view being partly broken away and being taken from the left hand side of Figure 1.

Referring to the drawing, particularly Figures 1 and 2, it will be seen that the pipe is indicated by the reference character 1 and the hose by the reference character 2. The hose clamp in this form of the invention comprises a flexible metal strap 3 which is adapted to encircle the hose, as shown in Figure 1. It is provided with an intermediate portion which is folded back and forth, as indicated at 4, to provide a reinforced section. This reinforced section is formed from the strap itself. It is preferably formed, as shown in Figure 1, by first forming a main loop and thereafter folding this main loop downwardly upon itself to thereby provide four thicknesses through which the screw 5 passes, the head 6 of the screw bearing against the reinforced portion 4.

One end of the strap 3 is indicated by the reference character 7 and forms a bridge piece, being passed beneath the screw 5 and beneath the angular fitting 8.

This angular fitting 8 is provided with a threaded aperture which receives the screw 5. It is also provided with an outwardly turned foot 9 which is apertured and through which the free end 10 of the clamping strap passes.

It is to be noted particularly that the foot 9 is very closely adjacent the projecting portion or end of the screw 5 and that the screw passes over and above the adjacent portion of the free end 10 of the strap, thereby causing the strap to form a short, sharp bend about the foot portion 9 and preventing the retraction of the strap.

In the initial tightening of the strap the screw 5 is unscrewed until the free end 10 can project upwardly, as indicated in dotted lines in Figure 1. This free end is then grasped by the hand of the operator or by a pair of pliers and pulled outwardly so as to tighten the strap about the hose in about the same manner as a belt is tightened. Thereafter this free end is bent downwardly into the full line position shown in Figures 1 and 2 and the screw 5 is then tightened. During the tightening of the screw, the end passes over the adjacent portion of the free end 10 and forms the sharp bend hereinbefore referred to, thereby preventing the sliding of the strap backwardly through the foot 9 of the fitting 8.

It is preferable to make the screw of hardened steel and have the threads of the projecting end of the screw slightly cut into the folded portion of the strap. This projecting portion of the screw does not draw the strap tight but serves to firmly hold the looped or folded portion of the free end of the strap from unfolding and slipping back through the portion 9 or 9' of the fitting 8 or 8' respectively. The tightening of the strap is obtained solely by the threaded engagement of the screw with the fitting 8 or 8'.

Figures 3, 4:
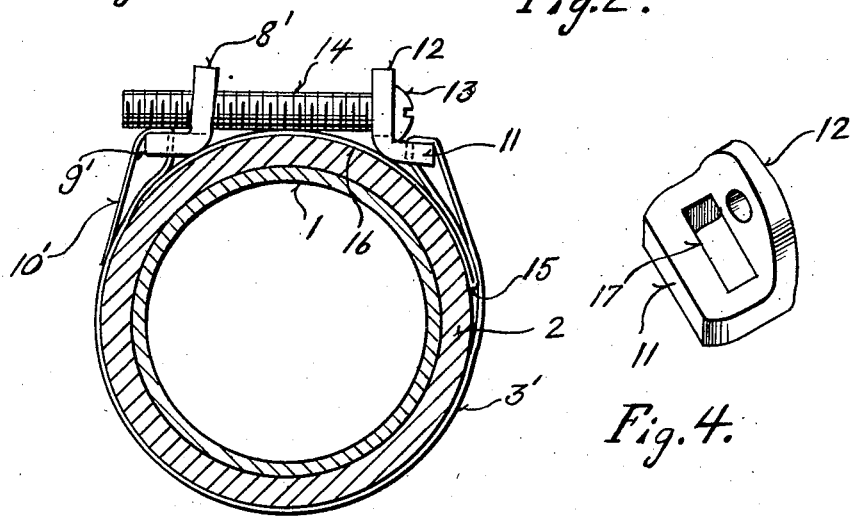
Figure 3 is a view corresponding to Figure 1, showing a modified form of the invention.
Figure 4 is a view of one of the fittings removed from the rest of the apparatus.

In the form shown in Figure 3 the same reference characters 1 and 2 have been used to indicate the pipe and hose, respectively. In this form of the invention the same type of fitting, indicated by the reference character 8', is employed and is provided with a projecting foot 9' similar to the foot 9 previously described. This foot is apertured and receives the free end 10' of the strap 3'. However, this strap has an intermediate portion threaded through the apertured foot 11 of a fitting 12 provided adjacent the head 13 of the screw 14. This intermediate portion is looped downwardly, as indicated by the reference character 15 in Figure 3, and the downwardly looped portion is received beneath the adjacent portion of the strap and is bound against the hose 2. One end 16 of the strap is folded upwardly and passes beneath the screw 14, thus forming a bridge piece for the screw.

One of the fittings, for instance the fitting 12, has been shown in Figure 4 detached from the rest of the apparatus.

This fitting, as well as the fittings 8 and 8', is stamped from sheet metal and is shaped so as to form an approximate angle member with a substantially rectangular aperture 17 formed in the approximately horizontal foot portion. This aperture receives the hose strap, as has been previously described. Obviously the fitting 12 is not provided with a threaded aperture, whereas the fittings 8 and 8' are provided with threaded apertures.

It will be seen that the hose clamp may be very cheaply manufactured and may be applied with the utmost ease. Further, in view of its adjustable nature, it is obvious that only one size need be carried in stock, and that this size will fit a large number of hoses of different sizes. Further, it will be seen that the initial adjustment of the device may be most easily made, and that no special precautions are needed to prevent the free end of the strap from sliding backwardly, as in each form of the invention the screw itself prevents the retraction of the free end of the strap.

Although this invention has been described in considerable detail, it is to be understood that such description is intended as illustrative rather than limiting, as the invention may be variously embodied and is to be interpreted as claimed.

I claim:

1. An adjustable hose clamp comprising a strap adapted to encircle a hose, said strap having screw receiving means adjacent one portion thereof, a screw passing through said portion, a fitting into which said screw is threaded, said fitting having an aperture therethrough for the reception of the free end of said strap and having a pressure transmitting portion for forcing said strap against said screw, said strap being looped back over said portion, whereby slipping of said strap with respect to said fitting is prevented.

2. An adjustable hose clamp comprising a strap adapted to encircle a hose, said strap having screw receiving means adjacent one portion thereof, a screw passing through said portion, a fitting into which said screw is threaded, said fitting having an aperture therethrough for the reception of the free end of said strap and having a pressure transmitting portion for forcing said strap against said screw, said screw being looped back over said portion, whereby slipping of said strap with respect to said fitting is prevented, said strap having an intermediate portion passing between said screw and said hose and forming a protecting bridge member.

3. An adjustable hose clamp comprising a strap adapted to encircle a hose, screw receiving means carried by said strap, a screw passing through said means with its head bearing against said means, a fitting into which said screw is threaded, said fitting being L-shaped and having one arm thereof in close proximity to and approximately parallel to said screw, said arm having an aperture for the reception of the free end of said strap and binding said strap against said screw when said screw is tightened, said strap being immovable with respect to said arm while said screw is being tightened.

4. An adjustable hose clamp comprising a strap adapted to encircle a hose, said strap having screw receiving means for permitting the free passage therethrough of a screw, a screw passing through said means and having a head engaging said means, an L-shaped fitting having an outwardly extending arm provided with an aperture therethrough through which the free end of said strap may be freely drawn in initially adjusting said clamp, said fitting receiving said screw, the free end of said strap passing over said arm below said screw and being clamped between said arm and said screw and being immovable with respect to said fitting when so clamped.

5. An adjustable hose clamp comprising a strap having an intermediate portion folded to provide a reinforcing head, a screw passing through said head, a fitting adjustably receiving said screw and having a slot therethrough for the reception of the free end of said strap, said fitting being L-shaped and pivoting upon the corner and having an arm located between said hose and said screw for clamping said strap against said screw when said screw is tightened.

6. An adjustable hose clamp comprising a strap having an intermediate portion folded to provide a reinforcing head, a screw passing through said head, a fitting adjustably receiving said screw, said fitting being L-shaped and having an arm located between said hose and said screw and provided with a slot, the free end of said strap being passed upwardly through said slot and outwardly over the rear portion of said arm below said screw, said arm acting to clamp said strap against said screw when said screw is tightened, said strap having a portion thereof projecting from said folded portion and located between said screw and said hose and providing a protecting bridge piece.

7. An adjustable hose clamp comprising a strap adapted to encircle a hose, an L-shaped fitting apertured for the free reception of a screw, a screw passing through said fitting with its head bearing against the outer side of said fitting, said fitting having an apertured portion for the reception of an intermediate part of said strap, said strap being reversely looped with the reversely looped portion bound between an intermediate portion of said strap and said hose and having an extending tongue located between said screw and said hose, and a second fitting cooperating with said screw and adjusted thereby, said second fitting having an L-shaped apertured arm located between said screw and said hose, the free end of said strap being passed through the aperture in said second mentioned fitting and over a portion of said second fitting adjacent said aperture and being locked between said portion of the second fitting and said screw, whereby retraction of said strap is prevented when said screw is tightened.

ANTON SUCHTER.